Nov. 2, 1954  M. J. PASCULLE  2,693,564
INTERPOLE-WINDING SHUNTING
Filed July 10, 1953
Fig. I.
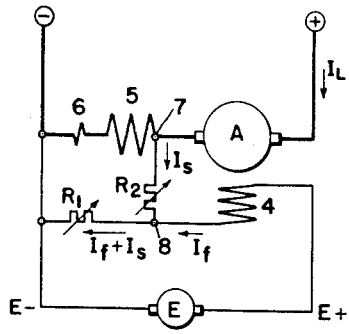
Fig. 2.
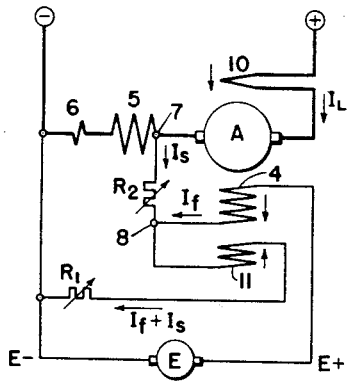
Fig. 3.
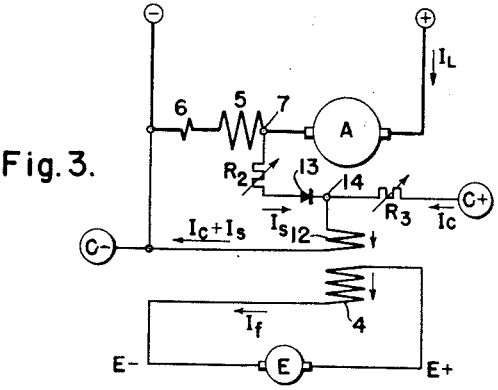
WITNESSES:
John E. Hensley
Leon J. Vaga
INVENTOR
Maurice J. Pasculle.
BY O.B.Buchanan
ATTORNEY

United States Patent Office 2,693,564
Patented Nov. 2, 1954

2,693,564

INTERPOLE-WINDING SHUNTING

Maurice J. Pasculle, Pittsburgh, Pa., assignor to Westinghouse Electric Corporation, East Pittsburgh, Pa., a corporation of Pennsylvania Application July 10, 1953, Serial No. 367,297

17 Claims. (Cl. 318—351)

My invention relates to large direct-current dynamoelectric machines, particularly such machines which are provided with a shunt-type field-winding in which the excitation is varied over a considerable range.

The machines to which my invention is applicable are all large-sized direct-current motors or generators, mostly motors, or in any size where precise regulation is required. They all have a compensating winding and a commutating winding, both connected in series with the armature. They have rotor-diameters of 45 inches and above, or even as low as 32 inches and above. Their horsepower ratings range from 500 to 7,000, or even 12,000 horsepower. Their voltages vary over a considerable range: 250 volts is the most common, but voltage-ratings of 600, 700, 750 and 800 volts are also used. Such motors are used for steel-mill drives, or other rolling-mill drives. The larger ones have base-speeds of 30 or 35 R. P. M., which may be increased, by field-weakening, up to two, three or even four times the base-speed. The smaller motors to which may invention is particularly applicable have base-speeds of 200, 300, or even 400 R. P. M.

A basic novel feature of my invention is to provide a special shunting circuit which is connected across at least the commutating winding of the machine, and preferably across the commutating and compensating windings considered as a unit. This special shunting circuit contains two serially connected resistance-devices; and a means is provided for circulating, through one of these resistance-devices, a controlling current-component having a value which is substantially independent of the armature-current of the machine. Various useful things can be accomplished with this special shunting means.

The most important field of application of my special shunting circuit is to provide a means for avoiding the necessity for an auxiliary commutating winding, such as was used in my invention which was described in my copending application Serial No. 293,637, filed June 14, 1952, now Patent No. 2,666,882, on an auxiliary commutating field. In my present invention, I avoid the necessity for providing an auxiliary commutating winding by energizing one of the resistance-devices of my special shunt, either in series or in parallel circuit-relation to the shunt-type field-winding, so as to be responsive to the variable excitation of the field winding.

Another application of my special shunting means is in connection with a compound machine, having a main series field-winding, connected in series with the armature, in addition to the other windings which have been mentioned. In this form of application of my invention, I provide an auxiliary compounding field-winding, which is connected in series with one of the resistances of my special shunting-circuit; and this auxiliary compounding winding and said resistance are connected in such electric-circuit relation to the shunt-type field-winding as to be responsive to its variable excitation.

A third illustrative form of my invention is applicable in those few cases in which it is practically impossible to obtain a stable operating-performance in a compound motor having a variably excited shunt-type field-winding. In this case, I provide a compounding field-winding which takes the place of one of the resistances of my special shunting-circuit, and I excite this compounding field-winding with a special control-current which is preferably obtained from a reference-voltage source.

With the foregoing and other objects in view, my invention consists in the circuits, systems, combinations, machines, parts, and methods of design and operation, hereinafter described, and illustrated in the accompanying drawing, wherein the three figures are simplified diagrammatic views illustrating the three above-mentioned applications of my invention.

In Fig. 1, I have diagrammatically indicated my invention as applied to a motor which includes an armature A, a shunt-type field-winding 4 which may be either separately or self-excited, a series compensating winding 5, and a series commutating or interpole winding 6. The compensating and commutating windings 5 and 6 are both connected in series with the armature A, and usually they are connected in series with each other and considered together as a circuit-unit of the motor, so far as external circuit-connections are concerned. Thus, the compensating and commutating windings 5 and 6 may have one terminal which is connected to the negative direct-current supply-terminal (—) of the motor, and a second terminal 7 which constitutes the negative armature-terminal. The positive armature-terminal is connected to the positive direct-current supply-terminal (+).

The shunt-type field-winding 4, in Fig. 1, is adapted to be energized with a variable effective field-voltage which is provided across field-exciting terminals E+ and E—. Any means for providing a variable excitation-voltage (or current) may be used, as symbolized by the variable-voltage exciter E, in Fig. 1, the variable or controllable excitation-means for this exciter being omitted for simplicity, being well known.

In accordance with my present invention, I provide a special shunting circuit, which is shown as being connected across the compensating and commutating windings 5 and 6, considered as a unit, although, theoretically at least, this shunting circuit could be connected in shunt-circuit relation to only the commutating winding 6, in which case the shunting-circuit would be adjusted for a different overall resistance or voltage-drop. This shunting circuit, in Fig. 1, consists of two resistances $R_1$ and $R_2$, which are connected in series with each other. One terminal of the resistance $R_1$ is connected to both the negative motor-supplying terminal (—) and the negative field-excitation terminal E—; one terminal of the resistance $R_2$ is connected to the previously mentioned negative armature-terminal 7; and the common connection between the resistances $R_1$ and $R_2$ is connected to the negative shunt-winding terminal 8. Preferably, both of the resistances $R_1$ and $R_2$ of this shunting-circuit are adjustable, or initially preselectable to a particular one out of a predetermined range of resistance-values, although only one of said resistances could be adjustable or preselectable. Usually, it will be found desirable to make at least the resistance $R_2$ adjustable or preselectable.

In Fig. 2, my special shunting-circuit is shown as being applied to a compound motor which, in addition to the parts which are shown in Fig. 1, comprises a main series field-winding 10, which is connected in series with the armature A, and an auxiliary compounding field-winding 11, which is connected in series with the variable shunt-circuit resistance $R_1$, that is, in the circuit between the negative shunt-winding terminal 8 and the two negative terminals (—) and E—.

In the third illustrative form of application of my special shunting-circuit, as shown in Fig. 3, the motor is again a compound motor, but it is not provided with the series field-winding 10 which is shown in Fig. 2. This motor is provided with a compounding field-winding 12, which takes the place of the shunting-circuit resistance $R_1$ in Figs. 1 and 2. Thus, in Fig. 3, the shunting-circuit may be traced from the negative armature terminal 7, through the variable resistance $R_2$, a unidirectionally conducting device or rectifier 13, the positive terminal 14 of the compounding field-winding 12, and thence through this winding to the joined negative terminals (—) and C—. This last-mentioned terminal C— is the negative terminal of a reference-voltage source, which has a positive terminal C+, which is connected, through a variable resistor $R_3$, to the positive terminal 14 of the compounding field-winding 12.

To gain a better insight into the nature and operation of my machines, it may be considered that, roughly speaking, the shunt-type field-winding 4 requires an excitation-energy, consumed within the winding, of approximately ½ kilowatt per pole, which would be multiplied by from two to four times, to obtain the rating of the exciter E, allowing a margin for field-forcing. The pole-number ranges from six poles, with a 32-inch armature-diameter, up to twenty-four poles, with a 144-inch armature-diameter, or even larger machines, if they are built. The field-amperes $I_f$ are normally about 100 to 200 amperes, maximum, but as much as 550 field-winding amperes can be used, on reversing mills for example.

As contrasted with the shunt-field amperes $I_f$, the main load-current $I_L$, in the armature, may range from 800 amperes up to 5,000 or 6,000 amperes, or even higher. These figures are given, not by way of limitation, but as being illustrative of the usual fields of application of my invention.

Considering the operation of the motor shown in Fig. 1, let us assume, by way of example, that this motor is rated at 500 horsepower, 250 volts, direct-current, and a full-load armature-current $I_L$ of 1,600 amperes. It is never possible to design such a machine so that exactly the right number of ampere turns will always be provided in the compensating and commutating windings 5 and 6, and so it has been customary to allow as much as 100 amperes, at the maximum, to be shunted out of these windings, by means of an adjustable field-shunt. Prior to the invention which was described in my previously mentioned application, however, it was necessary to automatically vary the shunting resistance whenever an adjustment was made in the excitation of the shunt-type field-winding 4, and it was also necessary to make a series of tests on each individual motor, in order to determine the magnitudes of the resistance-steps which were needed for this automatic adjustment. My present invention, as shown in Fig. 1, makes this automatic resistance-adjustment unnecessary, and it accomplishes this purpose without requiring an auxiliary commutating winding, as was required in the motor shown in my copending application.

In the motor shown in Fig. 1, my special shunting-circuit containing the resistances $R_1$ and $R_2$ is adjusted so that it draws an acceptably correct shunting-current $I_S$, which is correct, within tolerable limits, for all values of the field-winding current $I_f$, and for all values of the load-current $I_L$. And this operation is provided, without requiring any adjustment of the resistances $R_1$ and $R_2$ during the operation of the machine.

Before the motor of Fig. 1 is sold, it is tested at the factory, at full load, and at its base speed, which is its lowest speed, which is obtained with full-field excitation, or its maximum value of the field-current $I_f$. A preferred method of adjustment would be to set the resistance $R_1$ at such a value, under these conditions, that when it is traversed by the full-field exciting-current $I_f$, the voltage-drop $I_f R_1$ across this resistance will equal the voltage-drop which is produced by the passage of the full-load armature-current $I_L$ through the compensating and commutating windings 5 and 6, so that the amount of current $I_S$ which is shunted from said compensating and commutating windings will be zero; or this value might be set so that the shunted current $I_S$ has any other value which may be necessary to produce satisfactory commutation under the assumed conditions of full load and base speed. When the speed is increased, by reducing the strength of the field-current $I_f$, the voltage-drop $I_f R_1$ is reduced, and hence a finite value of shunting-current $I_S$ is drawn, which can be adjusted, at the factory, by means of the resistor $R_2$, which is preferably adjusted under full-load conditions.

At loads other than full-load, the shunting current $I_S$ which is provided by my present invention will be in a direction opposite to the arrow shown in Fig. 1, so that it will boost the current in the compensating and commutating windings 5 and 6 at loads below full load, or whatever other load-value is chosen for the factory-setting of the resistance $R_1$. At overloads, the shunting current $I_S$ is in the direction shown in Fig. 1, thus reducing the excitation of the compensating and commutating windings 5 and 6 in an amount which is linearly proportional to the amount of an overload. Tests have shown that entirely satisfactory operating-conditions can be obtained in this way, thereby dispensing with the necessity for an auxiliary commutating winding, which was required in the motor of my previously mentioned application, and also dispensing with the necessity for manipulating (or changing the value of) a heavy-current shunting-resistor during the speed-controlling operation of the motor.

The application of my invention which is shown in Fig. 2 is useful in preventing the occurrence of an objectionable rise in the speed of a compound motor, at loads in the range of from ⅓ load to no load, or other similar range. This objectionable rise in speed, in previous compound motors, has been due to the fact that the regular series field-winding 10 produces zero ampere-turns at no load. I avoid this difficulty, in Fig. 2, by providing the auxiliary compounding field-winding 11, which supplements the action of the series field-winding 10, in a manner which is dependent upon both the value of the load-current $I_L$ and the value of the excitation-current $I_f$ which controls the speed.

In Fig. 2, the resistance $R_1$ is preadjusted, at the factory, so that the current component $I_S$ which is shunted from the compensating and commutating windings 5 and 6 is zero at any desired load-value and at, say, the full-field value of the exciting-current $I_f$. At loads below this value, with full-field excitation, the shunted current $I_S$ in Fig. 2 will have a negative value, so that it will be in a direction opposite to the illustrated arrow $I_S$, thus making the auxiliary compensating field-winding 11 act cumulatively with respect to both the series field-winding 10 and the shunt-type field-winding 4. The other resistance $R_2$ is preadjusted at the factory, so that the desired no-load value of ampere-turns is obtained in the auxiliary compounding field-winding 11, so as to prevent the objectionable speed-rise at no load. At loads above the point which gave zero-shunting current $I_S$ at full field, the shunted current $I_S$ will be in the direction shown, and the ampere-turns in the auxiliary compounding field-winding 11 will buck the ampere-turns of both the shunt field 4 and the series field 10, thus reducing the compounding effect of the regular series field-winding 10.

The effect of reducing the exciting field-current $I_f$ in Fig. 2, in order to produce weak-field operating-conditions, for increasing the speed of the motor above its base speed, is to decrease the value of the load-current $I_L$ at which the shunted current $I_S$ is zero. This is very desirable since, at any given load, a smaller amount of exciting ampere-turns is needed, during high-speed operation, than at the base speed. The effect of the excitation-system which is shown in Fig. 2 is therefore to obtain an automatic adjustment which not only prevents objectionable overspeeding at no load, but also modulates this excitation-adjustment in accordance with the amount of excitation-current $I_f$ and the amount of load-current $I_L$.

Attention may be called to a noteworthy difference between the operation of the motor-circuits which are shown in Figs. 1 and 2, with respect to the amount of current which is shunted from the compensating and commutating windings 5 and 6. In Fig. 1, where the object of my shunting circuit $R_1$, $R_2$ was primarily to produce the best commutating conditions under all operating-conditions, ranging from no load to the highest overload, and from the base speed to the highest weakened-field speed, the resistances $R_1$ and $R_2$ of the shunting circuit were sufficiently low to draw a range of shunting current which was needed to perceptibly change the current-value in the compensating and commutating windings 5 and 6, and thus to produce acceptable commutating conditions at all speeds and loads. The shunted current $I_S$, in Fig. 1, was therefore large enough to effect the required adjustment of the total commutating or interpole ampere-turns. This had to be adjusted, at the factory, to meet the individual needs of each particular machine, as it was manufactured, because experience has proved that there are sufficient differences in the field-strengths and commutation-requirements of different motors, to require such individual factory-adjustments.

In Fig. 2, however, the primary requirement was to control the amount of main-field excitation which is proportional to the load-current under different field-excitation conditions. In this case, therefore, the value of the shunted current $I_S$ was chosen primarily from the standpoint of the requirements of the load-responsive component of the main-pole excitation. For this reason, the auxiliary compounding field-winding 11 is usually wound with a large enough number of turns, so that it does not need to have a very large value of the shunted current Is, and hence this shunted current may be chosen so as to have a smaller value than is usually required in Fig. 1, although there is some commingling of both effects in Fig. 2.

The form of my invention which is shown in Fig. 3 is for the purpose of producing a compounding effect which is stable at all values or settings of the exciting-current $I_f$. In some motors, for example, it is desired to have no series or load-responsive field from no load to some intermediate load-value such as ⅔ load, and from this point on, to provide a series field which is proportional to the load-increments. A source of reference voltage, from the terminals C+ to C—, is provided, which may be a 200-volt constant-voltage source, or any other reference-source which may be needed or available. An adjustment of the current-component $I_c$ which is provided by this reference-source is obtainable by means of a factory preadjustment of the resistance $R_3$ in Fig. 3. This determines the load at which the shunted current $I_s$ is zero, or at which the voltage-drop due to the flow of the current $I_c$ in the compounding field-winding 12 is equal to the voltage-drop due to the flow of that particular value of load-current $I_L$ in the compensating and commutating windings 5 and 6.

At loads lower than this particular load-value, in Fig. 3, the voltage-drop in the compensating and commutating windings 5 and 6 will be less than the voltage-drop due to the flow of the reference-source current $I_c$ in the compounding winding 12, so that the shunt-current would tend to reverse and become opposite to the direction of the arrow $I_s$ in Fig. 3. The rectifier 13 is provided for the purpose of preventing this reversal of the shunted current $I_s$. When the load is higher than the critical value just described, the shunted current $I_s$ flows in the direction indicated by the arrow, and thus constitutes a component of exciting-current, flowing in the compounding coil 12, in proportion to the increment in the load-current $I_L$. This provides the effect of a series field at all loads above a predetermined set value, and no series field at all, at loads below this set or predetermined value.

It is to be understood that a rectifier such as the rectifier 13 could have been used, if desired, in either of the other circuits which were shown in Figs. 1 and 2, respectively.

While I have shown my invention in only three different forms of application, and while I have described it more particularly in its application to motors as distinguished from generators, and while I have given certain illustrative or preferred limitations as to specific sizes, currents, voltages and the like, I wish it to be understood that my invention is not limited in any of these respects, and that my invention contemplates the substitution of various equivalents for the elements which I have shown and described, as well as the omission of certain details which may not be needed, or the addition of other details which may be required.

I claim as my invention:

1. A direct-current dynamoelectric machine, including an armature, a shunt-type field-winding, a shunt-field excitation-circuit including a means for varying the excitation of said shunt-type field-winding over a considerable range, a compensating winding and a commutating winding connected in series with the armature, a shunting circuit connected across at least said commutating winding, but not across said armature, said shunting circuit containing two serially connected resistance-devices, each having a resistance, and a control-circuit means, directly including only one of said resistance-devices, for circulating therethrough a controlling current component having a value which is substantially independent of the armature-current of the machine, the resistance of at least one of said resistance-devices being initially preselectable to a particular one out of a predetermined range of resistance-values, to meet the individual needs of that particular machine.

2. The invention as defined in claim 1, characterized by the preselectable resistance-device being the resistance-device which is not directly included in said control-circuit means.

3. The invention as defined in claim 2, characterized by the fact that the portion of said shunting circuit which includes the resistance-device which is not directly included in said control-circuit means also includes a unidirectionally conducting device.

4. The invention as defined in claim 1, characterized by the resistances of each of said resistance-devices being initially preselectable to a particular one out of a predetermined range of values for that resistance-device, to meet the individual needs of that particular machine.

5. A direct-current dynamoelectric machine, including an armature, a shunt-type field-winding, a shunt-field excitation-circuit including a means for varying the excitation of said shunt-type field-winding over a considerable range, a compensating winding and a commutating winding connected in series with each other and in series with the motor-armature, a shunting circuit connected across said compensating and commutating windings, said shunting circuit containing two serially connected resistance-devices, each having a resistance, and a control-circuit means, directly including only one of said resistance-devices, for circulating therethrough a controlling current component having a value which is substantially independent of the armature-current of the machine, the resistance of at least one of said resistance-devices being initially preselectable to a particular one out of a predetermined range of resistance-values, to meet the individual needs of that particular machine.

6. The invention as defined in claim 5, characterized by the preselectable resistance-device being the resistance-device which is not directly included in said control-circuit means.

7. The invention as defined in claim 6, characterized by the fact that the portion of said shunting circuit which includes the resistance-device which is not directly included in said control-circuit means also includes a unidirectionally conducting device.

8. The invention as defined in claim 5, characterized by the resistance of each of said resistance-devices being initially preselectable to a particular one out of a predetermined range of values for that resistance-device, to meet the individual needs of that particular machine.

9. A direct-current dynamoelectric machine, including an armature, a shunt-type field-winding, a shunt-field excitation-circuit including a means for varying the excitation of said shunt-type field-winding over a considerable range, a compensating winding and a commutating winding connected in series with the armature, a shunting circuit connected across at least said commutating winding, but not across said armature, said shunting circuit containing two serially connected resistance-devices, each having a resistance, and a control-circuit means, directly including only one of said resistance-devices in such electric-circuit relation to the shunt-type field-winding as to be responsive to its variable excitation, the resistance of at least one of said resistance-devices being initially preselectable to a particular one out of a predetermined range of resistance-values, to meet the individual needs of that particular machine, the resistances of the shunting circuit being sufficiently low to draw a range of shunting current needed to make the current which traverses the commutating winding suitable for acceptable commutating conditions at all speeds and loads.

10. The invention as defined in claim 9, characterized by the preselectable resistance-device being the resistance-device which is not directly included in said control-circuit means.

11. The invention as defined in claim 9, characterized by the resistances of each of said resistance-devices being initially preselectable to a particular one out of a predetermined range of values for that resistance-device, to meet the individual needs of that particular machine.

12. A direct-current dynamoelectric machine, including an armature, a shunt-type field-winding, a shunt-field excitation-circuit including a means for varying the excitation of said shunt-type field-winding over a considerable range, a compensating winding and a commutating winding connected in series with each other and in series with the motor-armature, a shunting circuit connected across said compensating and commutating windings, said shunting circuit containing two serially connected resistance-devices, each having a resistance, and a control-circuit means, directly including only one of said resistance-devices in such electric-circuit relation to the shunt-type field-winding as to be responsive to its variable excitation, the resistance of at least one of said resistance-devices being initially preselectable to a particular one out of a predetermined range of resistance-values, to meet the individual needs of that particular machine, the resistances of the shunting circuit being sufficiently low to draw a range of shunting current needed to make the current which traverses the commutating winding suitable for acceptable commutating conditions at all speeds and loads.

13. The invention as defined in claim 12, characterized by the preselectable resistance-device being the resistance-device which is not directly included in said control-circuit means.

14. The invention as defined in claim 12, characterized by the resistances of each of said resistance-devices being initially preselectable to a particular one out of a predetermined range of values for that resistance-device, to meet the individual needs of that particular machine.

15. A direct-current dynamoelectric machine, including an armature, a shunt-type field-winding, a main series field-winding connected in series with the armature, an auxiliary compounding field-winding, a compensating winding and a commutating winding connected in series with each other and in series with the armature, a shunt-field excitation-circuit including a means for varying the excitation of said shunt-type field-winding over a considerable range, said shunt-field excitation-circuit also including said auxiliary compounding field-winding, and a circuit-means, including a performance-controlling resistance, for also connecting said auxiliary compounding field-winding in shunt relation across said compensating and commutating windings, the resistance of said performance-controlling resistance being initially preselectable to a particular one out of a predetermined range of resistance-values, to meet the individual needs of that particular machine.

16. A direct-current dynamoelectric machine, including an armature, a shunt-type field-winding, a compounding field-winding, a compensating winding and a commutating winding connected in series with each other and in series with the armature, a shunt-field excitation-circuit including a means for varying the excitation of said shunt-type field-winding over a considerable range, a compounding-field excitation-circuit including a means for varying the amount of current which this circuit supplies to said compounding field-winding, and a shunt-connection circuit-means, including a compounding-controlling resistance, for also connecting said auxiliary compounding field-winding in shunt relation across said compensating and commutating windings, the resistance of said compounding-controlling resistance being initially preselectable to a particular one out of a predetermined range of resistance-values, to control the slope of the curve expressing the compounding field in terms of the armature current.

17. The invention as defined in claim 16, characterized by said shunt-connection circuit-means including an asymmetrically connecting device, whereby said compounding field-winding receives a substantial load-responsive current-component, from its shunt connection across said compensating and commutating windings, only at loads in excess of the point where the voltage-drop across said compensating and commutating windings exceeds the voltage-drop due to the flow of said excitation-circuit current through said compounding field-winding.

No references cited.